(12) United States Patent
Lecornu et al.

(10) Patent No.: US 6,187,178 B1
(45) Date of Patent: Feb. 13, 2001

(54) SEPARATOR WITH SOLIDS DIVERTER

(75) Inventors: Paul Jeremy Lecornu, Shepton Mallet; Bruce Peter Smith, Weston-super-Mare; Robert Yawgyamfi Andoh, Mitcham, all of (GB)

(73) Assignee: Hydro International PLC, Clevedon (GB)

( * ) Notice: Under 35 U.S.C. 154(b), the term of this patent shall be extended for 0 days.

(21) Appl. No.: 09/051,599

(22) PCT Filed: Oct. 8, 1996

(86) PCT No.: PCT/GB96/02455

§ 371 Date: Jun. 11, 1998

§ 102(e) Date: Jun. 11, 1998

(87) PCT Pub. No.: WO97/14491

PCT Pub. Date: Apr. 24, 1997

(30) Foreign Application Priority Data

Oct. 20, 1995 (GB) .................................................. 9521541

(51) Int. Cl.[7] .................................................. B01D 21/26
(52) U.S. Cl. .......................... 210/108; 210/114; 210/115; 210/247; 210/304; 210/427; 210/512.1; 210/536; 210/521; 210/411
(58) Field of Search ............................. 210/104, 98, 106, 210/108, 114, 115, 247, 248, 521, 532.1, 540, 536, 304, 512.1, 411, 427, 116; 405/92; 209/155, 162, 163, 915; 251/299; 134/104.1, 169 R

(56) References Cited

U.S. PATENT DOCUMENTS

| 752,547 | * | 2/1904 | Harris et al. | 210/130 |
| 1,066,316 | * | 7/1913 | Piper | 210/116 |
| 1,150,673 | * | 8/1915 | Greth et al. | 137/124 |
| 2,762,202 | * | 9/1956 | Ponsar | 405/108 |
| 3,549,012 | * | 12/1970 | Mackrle | 210/108 |
| 4,194,975 | * | 3/1980 | Baker | 210/108 |

FOREIGN PATENT DOCUMENTS

| 2654679 | * | 6/1977 | (DE) . |
| 2706926 | * | 12/1994 | (FR) . |
| 952611 | * | 3/1964 | (GB) . |
| 2 082 941 | | 3/1982 | (GB) . |
| 2 223 958 | | 4/1990 | (GB) . |
| WO 95/11735 | * | 4/1995 | (WO) . |

* cited by examiner

Primary Examiner—W. L. Walker
Assistant Examiner—Terry K. Cecil
(74) Attorney, Agent, or Firm—Larson & Taylor PLC

(57) ABSTRACT

A separator includes a barrier 53 for retaining solid material thereon and an automatic mechanism for alternately preventing and allowing the flow of liquid to the separator outlet. When the flow is prevented, the liquid backs up through the barrier and washes the solids to a solids collection region 55. In one embodiment, the automatic mechanism includes a pivoted flap 101 and, in another embodiment, a siphon.

9 Claims, 8 Drawing Sheets

SEPARATOR WITH SOLIDS DIVERTER

This invention relates to an apparatus for separating solids out of a liquid.

WO95/11735 discloses a hydrodynamic separator, which incorporates a solids interceptor upstream of its overflow, for intercepting solid matter entrained in liquid flowing towards the overflow. The interceptor comprises a circular wall, which forms a weir in the flow path, and a generally conical barrier, extending from the wall towards a solids collection region. Thus, solid matter in the liquid flow is retained on the barrier, and is washed towards the solids collection region by the liquid, which then passes through the barrier, and on towards the outlet of the apparatus.

However, a problem with this known apparatus is that solid material may be retained on the barrier, without being washed towards the solids collection region. If this happens excessively, liquid is not able to pass through the barrier sufficiently quickly, and the outlet of the apparatus is effectively blocked.

WO95/11735 (FIGS. 10 and 11) proposed an arrangement in which a series of brushes are located above the interceptor, for removing solid matter from the barrier surface, but there are disadvantages associated with this arrangement.

In addition, the problem of the barrier becoming blocked can be reduced by increasing the angle of the cone. However, it is generally advantageous for the cone to have the shallowest possible angle, in order that the interceptor does not involve a large head loss in the liquid flow.

The present invention seeks to provide an apparatus which avoids at least some of the problems associated with the prior art.

According to a first aspect of the present invention, there is provided a separator for a liquid-solid mixture, comprising:

an inlet;

an outlet;

a diverter for solid material in the form of a perforated barrier, located upstream of the outlet such that, in use, solid material is retained on the barrier; and, located between the diverter and the outlet, an automatic mechanism for alternately preventing and allowing the flow of liquid to the outlet, such that, when liquid flow to the outlet is prevented, liquid flows back up through the barrier, so that solid material retained on the barrier is washed by the liquid towards a solids collection region.

According to a second aspect of the present invention, there is provided a solids interceptor, comprising a circular housing having a tangential inlet for a liquid-solid mixture, an outlet, and, upstream of the outlet, a diverter for solid material in the form of an annular perforated barrier located such that the mixture passes to the barrier, with liquid passing generally downwardly through the barrier towards the outlet and solid material being retained on the barrier and being washed by the liquid towards a solids collection region, characterised in that the interceptor further comprises, located in the outlet, an automatic mechanism for alternately preventing and allowing the flow of liquid through the outlet, such that, when liquid flow is prevented through the outlet, liquid flows back up through the barrier, until it reaches a level at which the mechanism operates to allow the flow of liquid through the outlet.

According to a third aspect of the present invention, there is provided a hydrodynamic separator, having an inlet for a liquid-solid mixture, an outlet, and, upstream of the outlet, a diverter for solid material in the form of a perforated barrier located such that the mixture passes to the barrier, with liquid passing generally downwardly through the barrier towards the outlet and solid material being retained on the barrier and being washed by the liquid towards a solids collection region, characterised in that the separator further comprises, located in the outlet, an automatic mechanism for alternately preventing and allowing the flow of liquid through the outlet, such that, when liquid flow is prevented through the outlet, liquid flows back up through the barrier, until it reaches a level at which the mechanism operates to allow the flow of liquid through the outlet.

For a better understanding of the present invention, and to show how it may be put into effect, reference will now be made, by way of example, to the accompanying drawings, in which.

Figure 1:
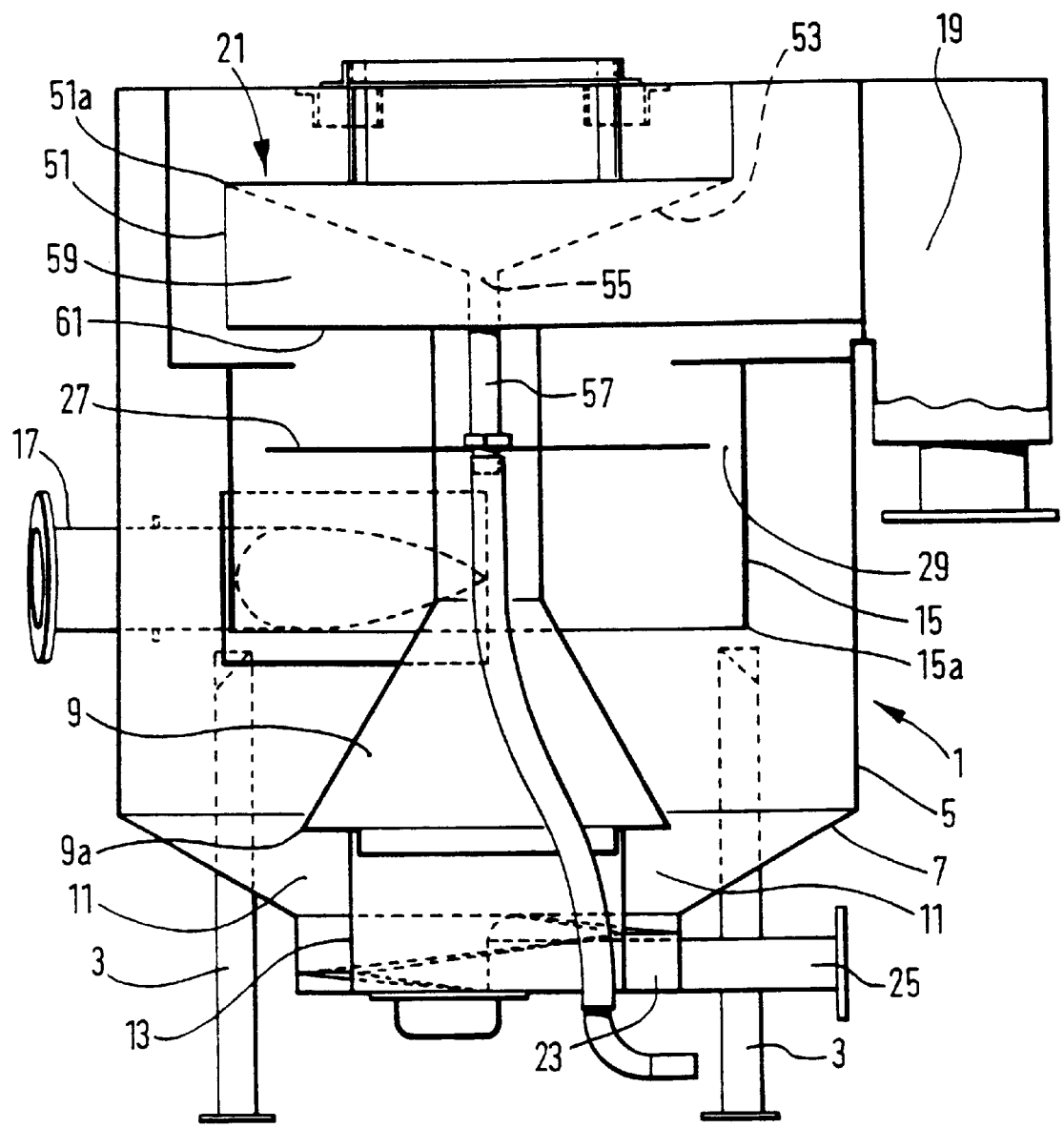
FIG. 1 is a cross-sectional view of apparatus in accordance with the invention.

One possible use of the separator according to the invention is as part of a hydro-dynamic separator. The hydro-dynamic separator shown in FIG. 1 is known from WO95/11735, apart from the arrangement in the outlet of the apparatus. The separator comprises a vessel 1 supported on legs 3. The vessel 1 has a cylindrical outer wall 5 and a sloping base 7 at one end. A conical body 9 is provided axially within the vessel 1 having a lower peripheral edge 9a which defines with the base 7 an annular opening 11 spaced from the outer wall 5. The body 9 is supported by a column 13 standing on the base 7. Projecting downwardly, from an upper region of the vessel 1, and spaced from the outer wall 5 thereof, is provided an annular dip plate 15 for stabilising flow patterns in the vessel 1; the dip plate terminates in a bottom edge 15a. A tangential vessel inlet 17 is formed as an opening in the outer wall 5 of the vessel 1 for introducing liquid mixture into the vessel 1. The separator has an overflow 19 in communication with the vessel 1, via an interceptor 21, for removing from the vessel 1 a treated liquid. A solids collection region 23 or sump is centrally disposed of the base 7 around the bottom of the column 13 for collecting solid matter separated from the liquid mixture. The sump 23 is provided with an outlet pipe 25 for removal of settled solids. A horizontal circular baffle 27, oriented axially in the vessel, is situated inwardly of the dip plate 15, above the conical body 9. An annular gap 29 is provided between the dip plate 15 and baffle 27 for the passage of fluid to the overflow 19.

Operation of the hydro-dynamic separator is as follows. A liquid mixture comprising solid matter is introduced into the vessel 1 via the tangential inlet 17. The arrangement of the components of the separator is such that, in use with a circulating flow of liquid and solid matter within the vessel 1 which is of a low energy in order that any separation of the solids component of the liquid in the vessel is brought about primarily by gravity, there is created a stabilised shear zone in the circulating liquid between an outer, relatively fast circulating region and an inner, relatively slowly circulating region and there is caused an inward sweeping effect of solids accumulated at the base of the vessel towards the said annular opening 11. In particular, the lower peripheral edge of the body 9a in the vessel and the bottom edge of the dip plate 15a define in use of the separator a shear zone and it is this shear zone which is important to the successful, stable operation of the separator. As fresh liquid to be treated is introduced into the vessel 1, treated liquid is forced to pass through the annular gap 29 between the baffle 27 and dip plate 15, and from there it passes into an upper region of the vessel and then to the overflow 19 via the solids interceptor 21. Solid material arriving in the sump 23 is removed via the outlet pipe 25.

Figure 6:
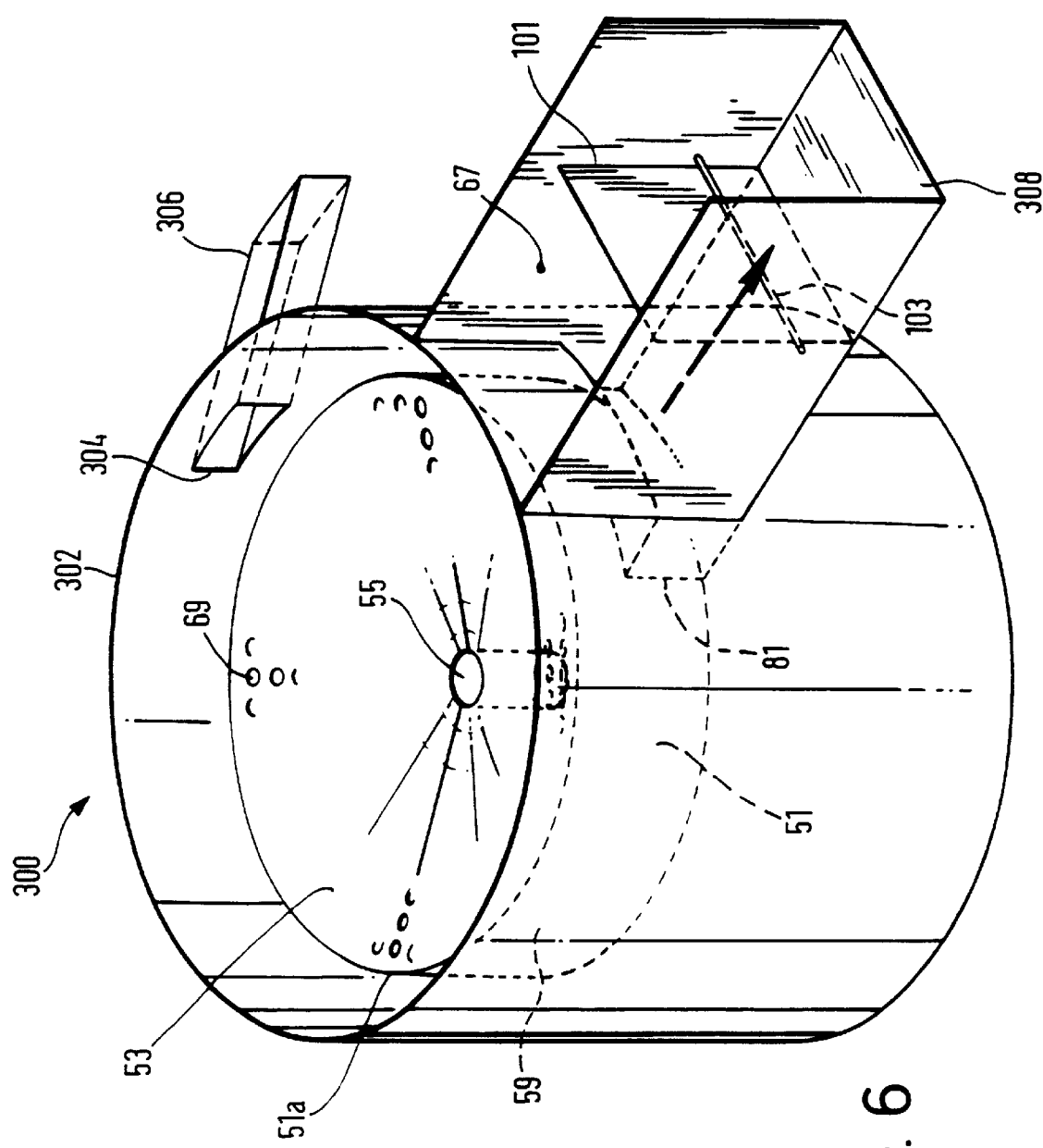
FIG. 6 shows a solids interceptor in accordance with the invention.

Thus, material which is either settleable or floatable, i.e. material which has a density different from that of the liquid, is removed by the separator in a conventional way. A solids interceptor 21 is disposed upstream of the overflow 19 for intercepting neutrally buoyant solid matter above a predetermined size entrained in liquid flowing towards the overflow 19. The solids interceptor 21 may also be used separately, as shown in FIG. 6, and as described hereafter.

Figure 2:
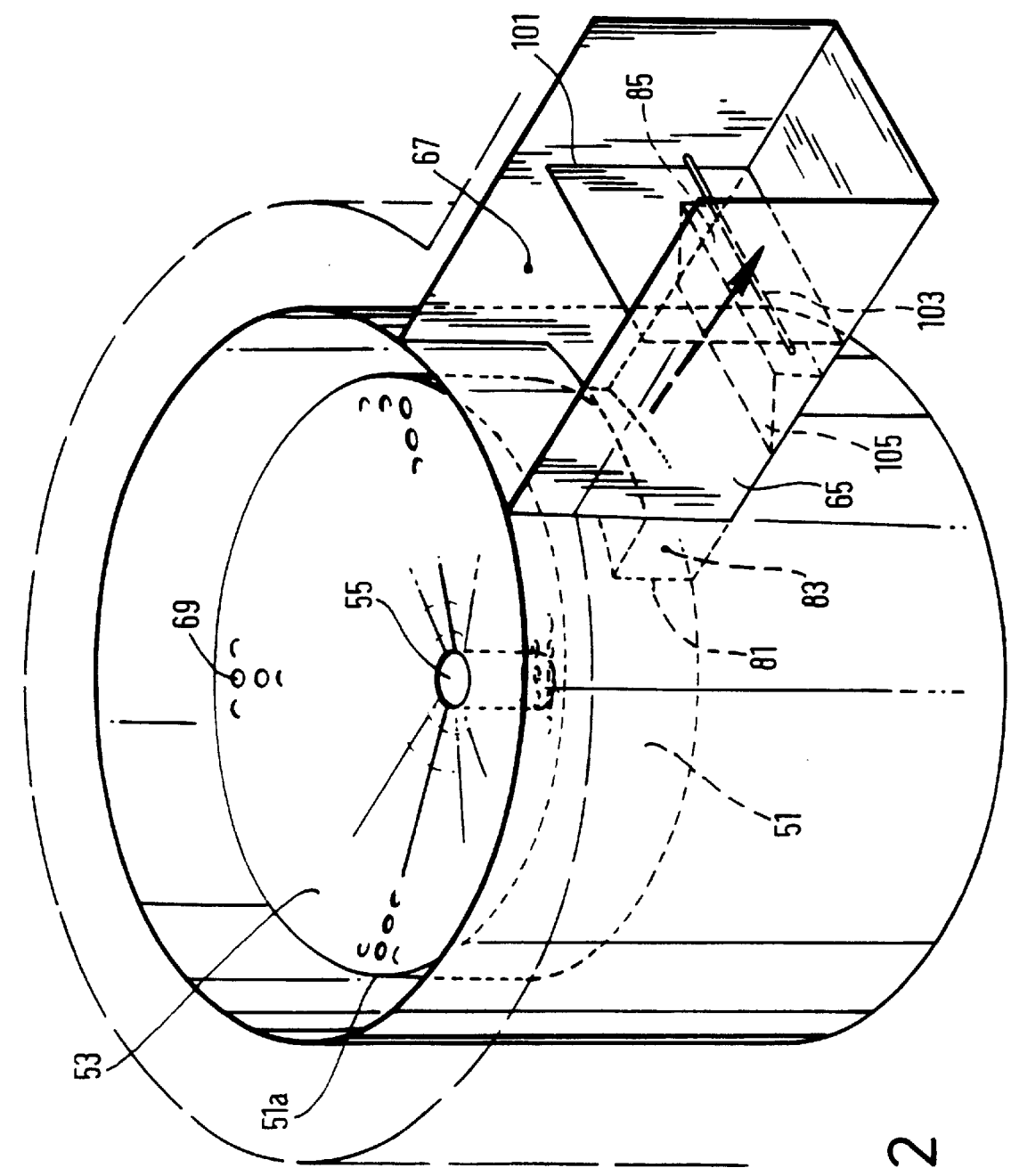
FIG. 2 is a partial perspective view of the solids interceptor and the apparatus outlet.

The solids interceptor 21 comprises an outer peripheral wall 51 which terminates in an upper edge 51a which constitutes a weir in the flow path of liquid flowing to the overflow 19. Extending inward from the outer peripheral wall 51 there is provided a perforated barrier 53. The upper surface of the barrier 53 is downwardly inclined towards a central solids collection region 55 which communicates with an outlet duct 57 which discharges through the base 7 of the vessel. A liquid collection region 59 is provided beneath the barrier 53 bounded by the outer peripheral wall 51 and a floor 61. The liquid collection region 59 is in fluid communication with the overflow 19 of the separator. In this embodiment, as shown in FIG. 2, the outer peripheral wall 51 has a cut-out 81, and discharges fluid from the liquid collection region 59 through a duct 83 into an overflow box 67 defined by vertical plates 65.

In use, the perforations 69 in the barrier 53 permit the flow of liquid through the barrier 53 but retain solids on its upper surface.

The invention is concerned with the way in which solids are washed off the upper surface of the barrier 53. When this surface is inclined at a relatively large angle to the horizontal, a small percentage of the liquid flow does not pass straight through the perforations, but flows down the barrier 53, and plays some part in washing material off the barrier. When the angle of inclination is smaller, the liquid all flows through the perforations. In either case, in accordance with the invention a backwash is generated, and solids retained on the barrier 53 are washed down the surface towards the central trap 55 and discharged through the base of the vessel 1 by the duct 57. Liquid flowing through the openings 69 in the barrier 53 is collected in the said liquid collection region 59 from where it flows to the overflow 19.

Located in the overflow box 67 is a flap 101, which is pivotably mounted to the side walls 65 of the overflow box 67 about an axle 103. Also shown in FIG. 2, located slightly upstream of the flap 101 is a weir 105. The use of such a weir may be helpful in some situations, but it is not essential, and reference to it will be omitted below.

Explanation of the operation of the flap 101 will be made below with reference to FIGS. 3 and 4, which are cross-sectional views through the overflow box 67 in different operating positions of the flap 101.

Figure 3:
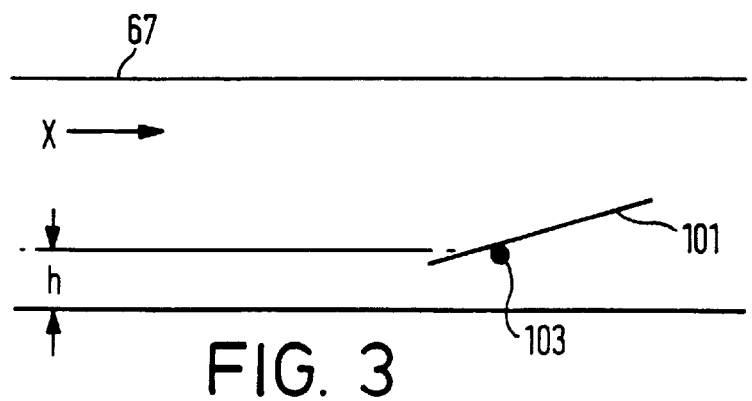
FIGS. 3 and 4 are cross-sectional views showing different operating states of a flow regulating device in the outlet of the apparatus.

When there is no liquid outflow, the flap 101 is biased to the position shown in FIG. 3. In its simplest form, this is simply due to the position of the eccentric pivot 103, although the flap 101 could be spring loaded, or provided with counter balancing weights, if required. Moreover, the flap may advantageously be curved, to increase the maximum flow through the outlet. Advantageously, the flap may be mounted so that there is the minimum of obstruction to the flow path, to avoid jamming by rags, etc.

Figure 4:
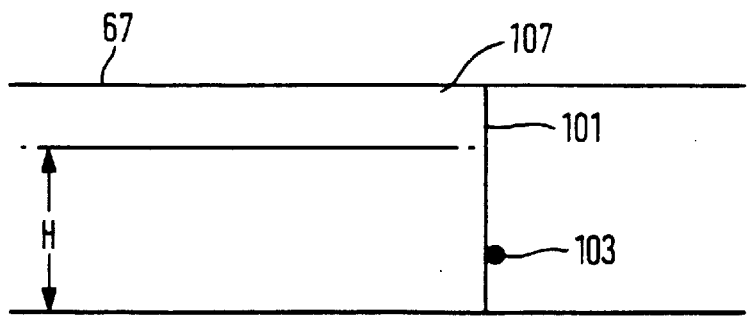

As the liquid flow rate increases, the additional pressure on the flap 101 causes it to pivot in an anti-clockwise direction, into the position shown in FIG. 4.

When the flap 101 is in the position shown in FIG. 4, liquid will obviously build up in the region 107 upstream of the flap. When the liquid level reaches a height H, the pressure will be sufficient to rotate the flap 101 in a clockwise direction, to the position shown in FIG. 3. Thereafter, the liquid level will fall until it reaches height h, at which point the flap will rotate back in an anticlockwise direction, to the position shown in FIG. 4. Thus, the flap moves automatically between the two positions.

The system may, for example, be designed such that, at operational flow rates, one cycle of operation is completed every 10–30 seconds. The system may, however, be designed such that the cycle time is appropriate to the amount of solid material and the liquid flow rate.

The purpose of this mechanism is that, when the flap is in the position shown in FIG. 4, such that it blocks the outlet, liquid builds up through the overflow outlet end of the apparatus. In particular, the height of the outlet is chosen, and the flap is designed such that, before the liquid level reaches the height H shown in FIGS. 4, liquid flows back up through the barrier 53. This has the advantageous effect that solids retained on the upper surface of the barrier are washed off it.

The backwash mechanism described above, with a pivoted flap, is one way of achieving the desired object, which is alternately to prevent the flow of liquid to the outlet and then, when the liquid level has reached a height at which it washes solid material off the barrier, to again allow the flow of liquid to the outlet. For example, the pivoted flap may be replaced by a self-priming siphon, a mechanically driven gate or valve, or any other suitable modification of the pivoted gate described above.

In the case of a self-priming siphon, it is necessary to draw the water level down as quickly as possible, and then "break" the siphon precisely at the required water level, with only a short slowing down period. This can be achieved by introducing a large volume of air into the crest of the siphon, more quickly than in conventional devices, in order to "break" the siphon. The use of such a siphon is described below with reference to FIG. 7.

The operation of the backwash mechanism ensures that the barrier 53 remains clear of obstructions, so that liquid can flow to the outlet of the apparatus.

There is thus provided an automatic mechanism for cleaning the barrier 53.

Figure 5:
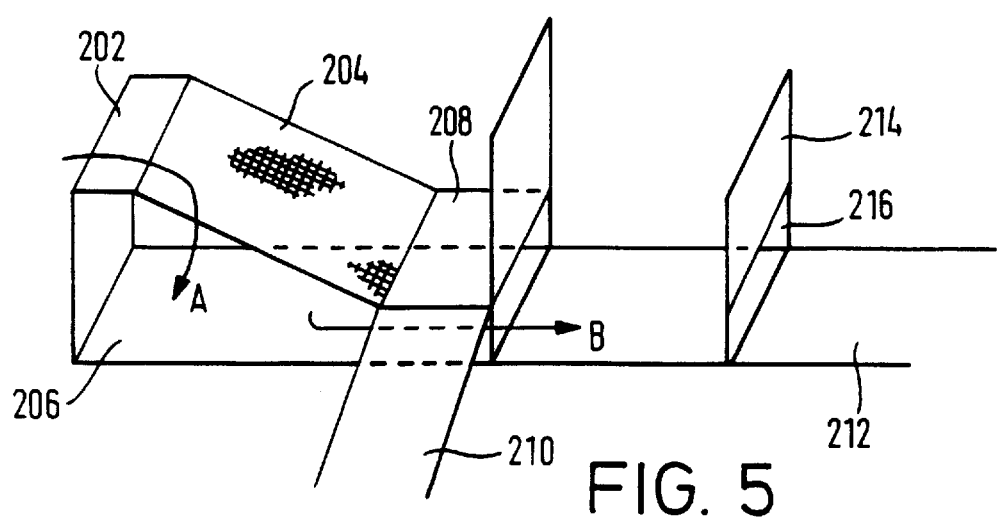
FIG. 5 is a perspective view of apparatus in accordance with a second aspect of the invention.

FIG. 5 shows a second embodiment of the invention. In the embodiment of FIG. 5, liquid, which contains solid matter, enters at an inlet 202. The influent flows over a perforated barrier 204. In this illustrated embodiment, the barrier 204 is a flat rectangular plate. However, it will be appreciated that the plate may be curved in some way, and may also be of any convenient shape. The screened liquid passes through the barrier 204, into a liquid collection region 206, as shown by arrow A, and then flows towards the outlet of the device, as shown by arrow B. Followed material in the influent is retained on the barrier 204, and washed towards a solids collection area 208, 210, for collection and disposal.

As mentioned above, screened liquid flows towards the outlet 212 of the device. Located upstream of the outlet 212, however, is a gate 214, with a pivot mechanism 216. The purpose of the pivot mechanism is to create a backwash, as described above.

The barrier 204 is preferably inclined, but, depending upon liquid flow rates, it may be possible to use a horizontal barrier, and rely on the inlet flow of liquid to wash solid material off the barrier towards the solid collection region.

As with the similar mechanism in the first embodiment of the invention described with reference to FIG. 2, the pivot 216 automatically opens and closes periodically. When the outlet is closed, liquid builds up in the device, until the liquid level is such that it washes solid material off the barrier 204, and towards the solids collection region 208, 210. When the liquid level reaches a certain height, the gate 214 automatically reopens, so that liquid can again flow to the outlet 212.

FIG. 6 shows a separator 300, which is generally similar to the separator described with reference to FIG. 2, but which is suitable for use as a free-standing piece of equipment. The separator 300 has an outer circular wall 302, provided with an inlet 304, to which liquid and entrained solids are fed in a generally tangential direction through inlet box 306. There is thus a circulation of liquid within the wall 302. The solids interceptor itself has an outer peripheral wall 51, having an upper edge 51a, which constitutes a weir in the flowpath of liquid. A perforated barrier 53 extends downwardly and inwardly from the outer peripheral wall 51 towards a central solids collection region 55. A liquid collection region 59 is located beneath the barrier 53. The outer peripheral wall 51 of the interceptor has a cut-out 81, which leads towards an outlet 308 of the separator. Liquid flows through the cut-out 81 into an overflow box 67.

In use, the perforations 69 in the barrier 53 permit the flow of liquid through the barrier, but retain solids on its upper surface. Preferably, the angle of inclination of the barrier 53 is small, so that all of the liquid passes through the perforations, provided that these are not blocked by solid material.

As described above with reference to FIG. 2, a flap 101 is located near the outlet 308 of the separator, and mounted about an axle 103. The mounting of the flap is such that, for a part of a cycle of operation, the flap 101 is inclined, that is it is in the open position. During this phase, liquid can escape from the separator more quickly than it enters, and so the liquid level falls. When the liquid level is low enough, the flap 101 returns to the vertical, that is, closed, position. This causes the level of liquid within the separator 300 to rise, until such time as it is higher than the level of the barrier 53. At this point, the solid material which has settled on the barrier 53 is floated up off the barrier, and is washed by the generally circulating flow of liquid towards the solid collection region 55.

Moreover, the increased level of liquid causes the flap 101 to return again to the open position, thus restarting the cycle. Thus, the system is such that solid material is washed off the barrier 53 automatically and at regular intervals.

Figure 7:
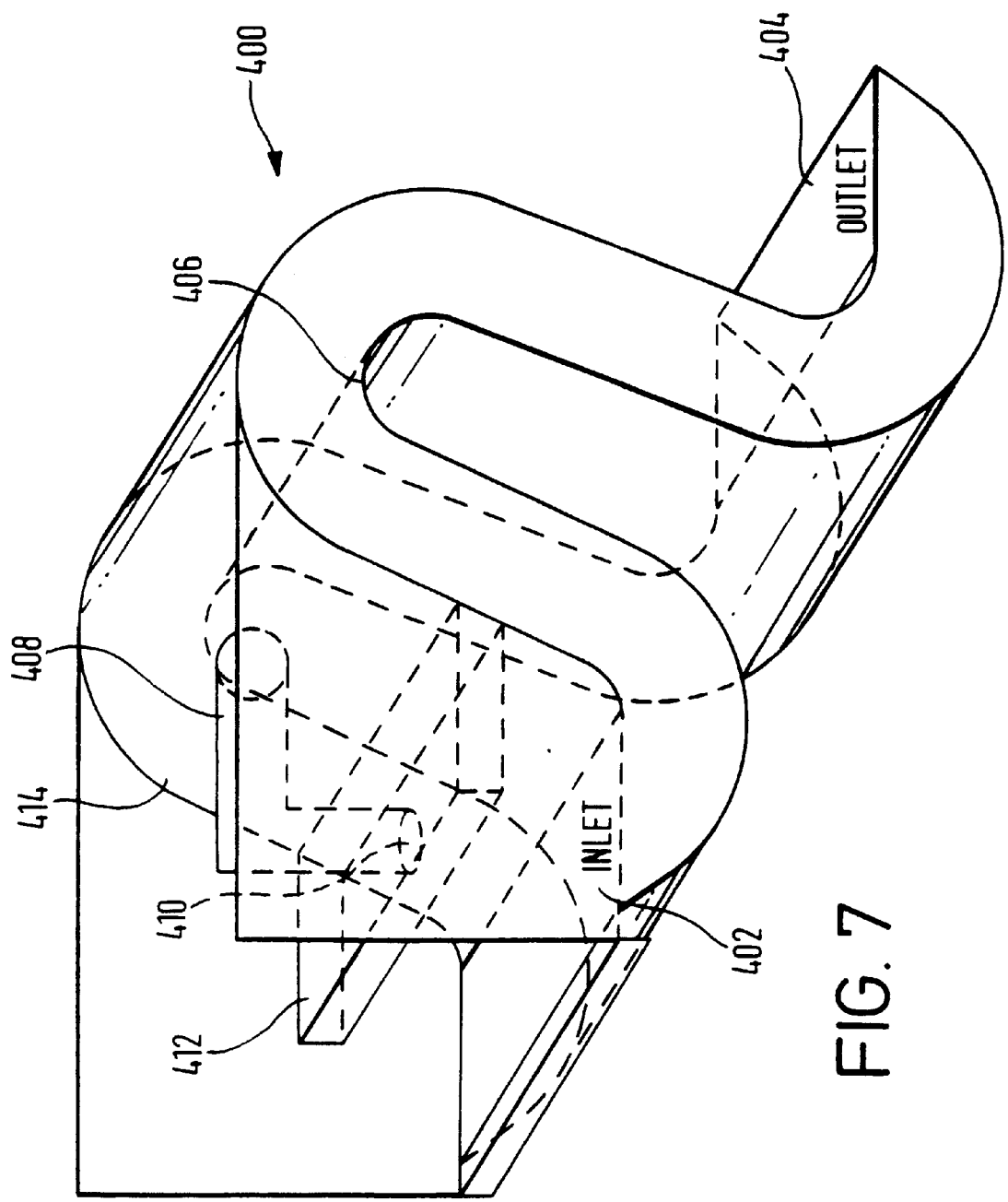
FIG. 7 shows a siphon, for use as the mechanism for alternately preventing and allowing liquid to flow to the outlet of the apparatus in accordance with the invention.

As described earlier, the mechanism consisting of the flap 101 in overflow box 67 can be replaced by a self-priming siphon, for example as shown in FIG. 7 in a similar overflow box. The siphon 400 shown in FIG. 7 is generally conventional, in that it has an inlet 402 and an outlet 404, which is at a lower level than the inlet. Between the inlet 402 and outlet 404, the level of the siphon increases to a crest 406, and then decreases again. An air break pipe 408 feeds into the crest 406 from a position above the inlet 402 of the siphon. The use of such air break pipes is known, but here the inlet 410 to the air break pipe is located in an open topped box 412, located on the inlet side 414 of the siphon, above the inlet 402.

As mentioned above, the use of an air break pipe in itself is known. However, it is often impossible, even when using such pipes, to introduce sufficient air into the crest of the siphon quickly enough to break the flow. This means that the flow of water through the device is never completely stopped.

FIGS. 8 to 13 illustrate the operation of the siphon 400.

Figure 8:
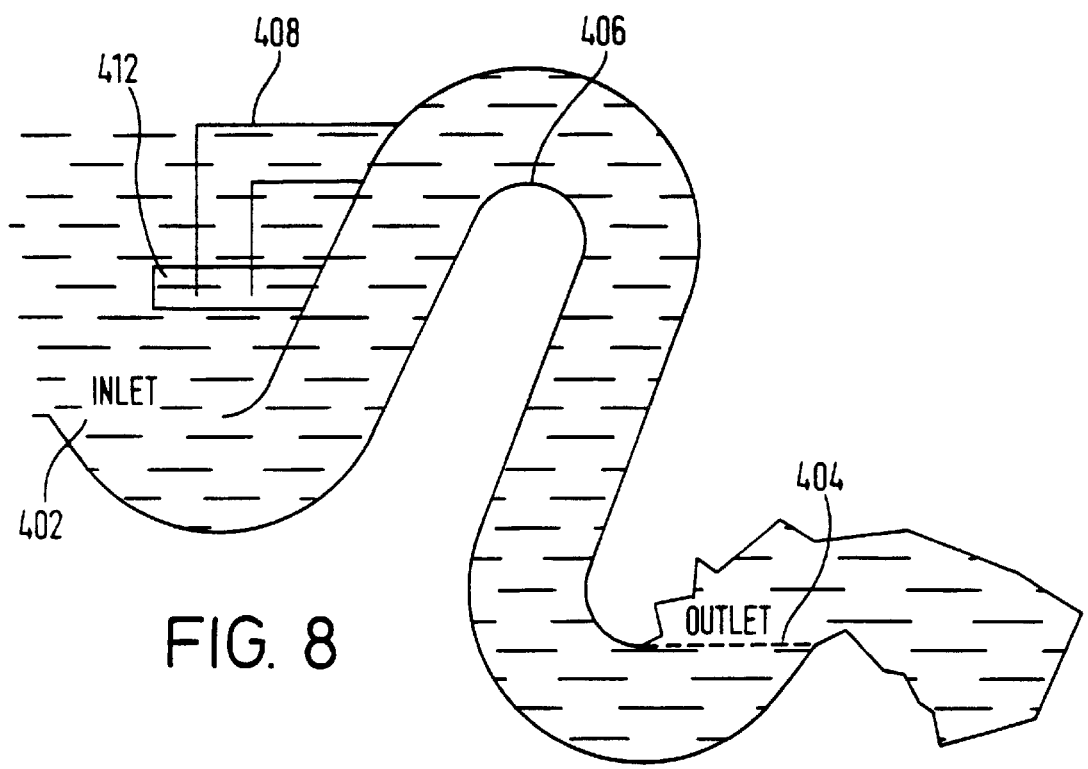
FIGS. 8 to 13 show different stages in an operating cycle of the siphon of FIG. 7.
Figure 9:
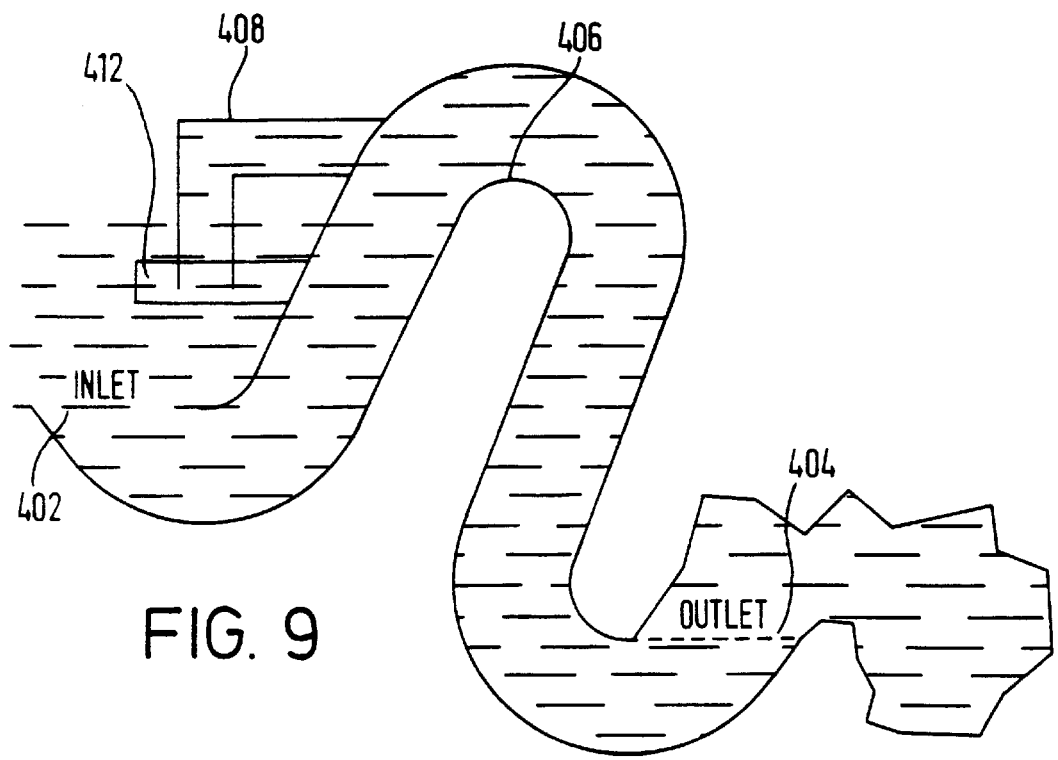

FIG. 8 shows the position where the liquid level upstream of the siphon is at its highest. Here, the siphon causes no resistance to the flow, and so the flow of liquid out through the outlet 404 is greater than the rate at which liquid arrives at the siphon. As a result, the upstream water level begins to fall, as shown in FIG. 9.

Figure 10:
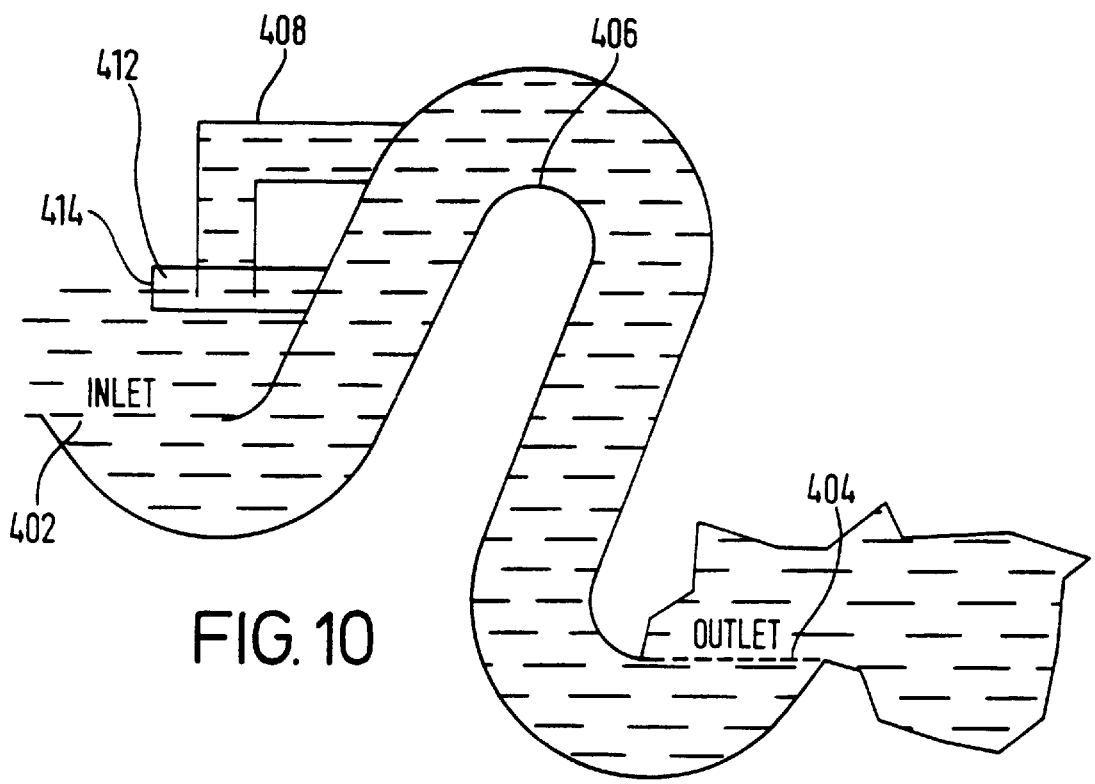

As shown in FIG. 10, this continues until the upstream water level falls below the top of the side walls 414 of the box 412. At this point, because the box 412 is connected to the crest 406 of the siphon, which is running at reduced pressure, the pipe 408 drains the liquid from the box 412. Once the box 412 is drained, the air control pipe 408 starts to draw air into the crest 406 of the siphon. This continues until, as shown in FIG. 11, the upstream water level drops to about the level of the bottom 416 of the box 412.

Figure 11:
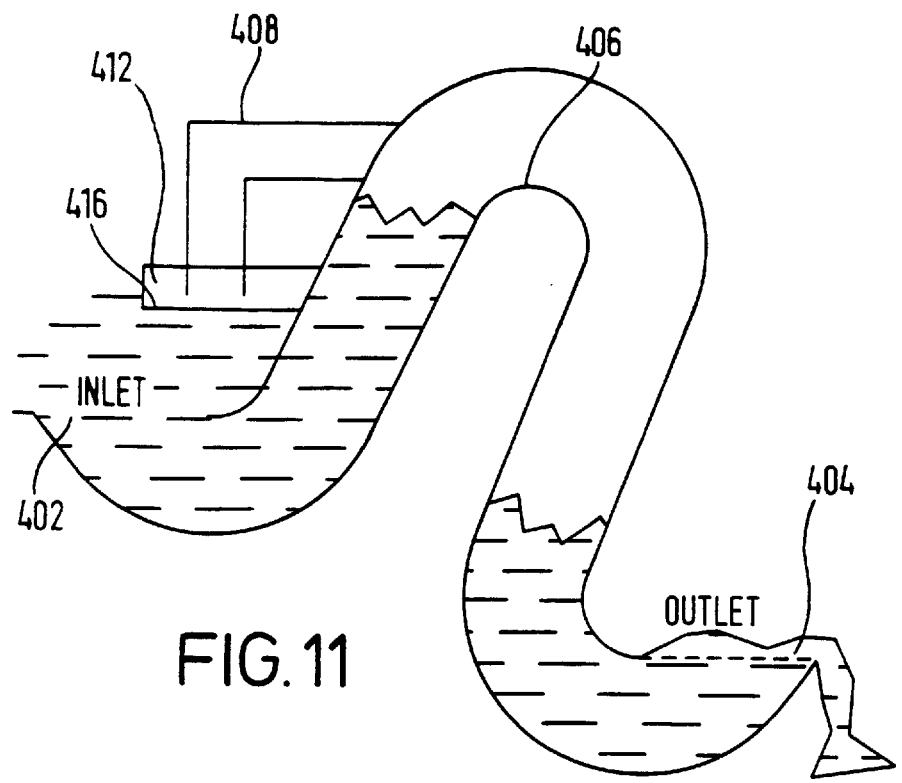

As air is being drawn into the crest 406 of the siphon, as shown in FIG. 11, the slow rate of liquid through the siphon slows, and the upstream water level starts to rise again. However, by contrast with prior art siphons, having no break box 412, and in which air stops being introduced into the siphon as soon as the rising water level reaches the level of the lowest point 418 of the air control pipe 408, in this case the air control pipe 408 only stops introducing air into the crest of the siphon once the rising water level reaches the tops 420 of the walls of the break box 412.

Figure 12:
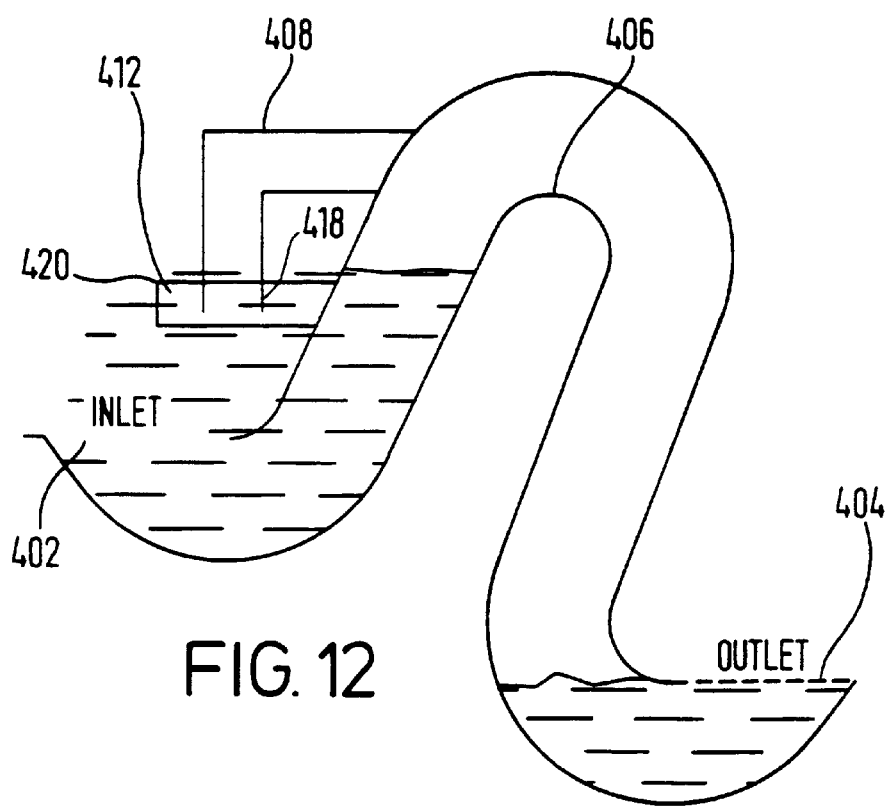

This increased period of time, for which air is being introduced into the siphon, means that sufficient air can be introduced to break the siphon altogether, and entirely stop the flow of liquid to the outlet 404. FIG. 12 shows the position in which the water level has just reached a sufficient level to stop the flow of air through the air control pipe 408.

Figure 13:
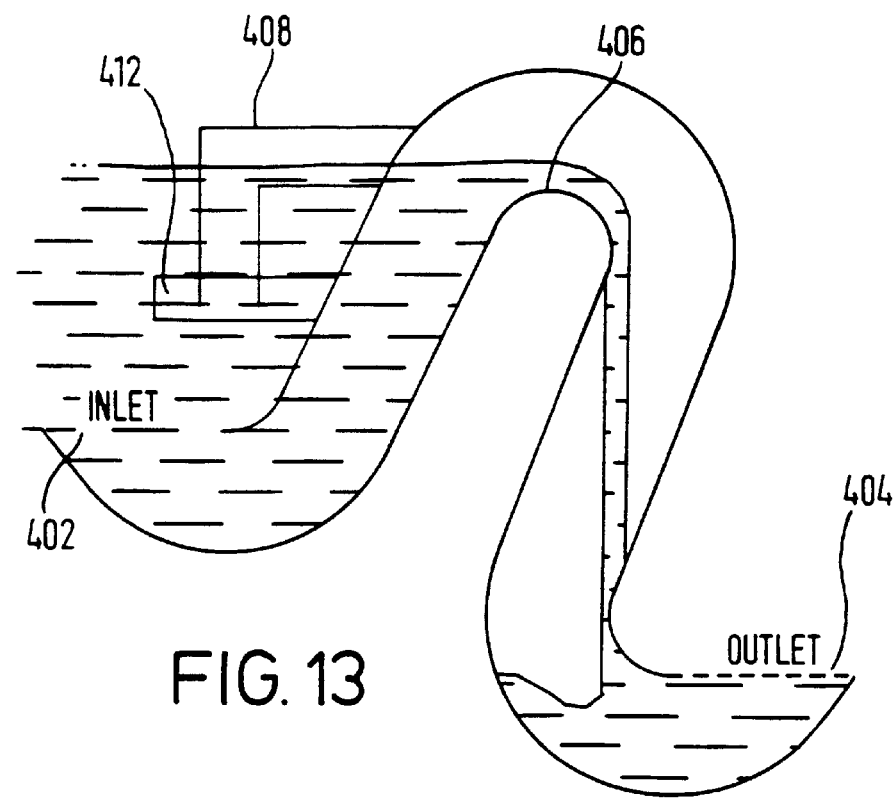

Thereafter, the upstream water level continues to rise until, as shown in FIG. 13, it just reaches a level at which it can flow over the crest 406 of the siphon to the outlet.

There is thus described a siphon which is self-priming, and which allows the flow of liquid to the outlet to be completely stopped at a point in the cycle.

Thus, whether using the siphon described above, or any other mechanism for alternately preventing and allowing the flow of liquid to the outlet, there is described a mechanism which effectively separates solid material from liquid on a barrier, and automatically clears the solid material from the barrier.

In order to enhace the performance of a separator in accordance with the invention, the perforated barrier may be coated in such a way that the perforations remain, but the solid part of the barrier is encapsulated within the coating. This has the advantage that any sharp edges of the barrier, such as may be caused by the punching process in which the barrier is formed from a sheet of metal, are covered by the coating. This has been found to reduce ragging.

The perforated barrier may be coated by, for example, dipping it in a bath of a liquid composition, or spraying -the article with a liquid composition so as to form a coating on the barrier, and then allowing the coating to solidify. Solidification may take place by simple cooling of the dipped article, for example where the liquid composition is a melt. Alternatively, where a solvent is present in the fluid composition, this may need to be removed by drying, which can be accelerated by heating if desired. It may also be that the coating requires a final curing step, but this will depend on the particular chemical characteristics of the coating.

Coating by a dipping process is presently preferred as this gives a more smooth coating on the barrier than that achieved by spraying.

The coating is preferably a polymeric material, such as a polyethylene, a polyester or a polyurethane.

What is claimed is:

1. A hydrodynamic separator, having an inlet for a liquid-solid mixture, an outlet, a hydrodynamic separation device for the mixture where solids therein are separated out due to a flow pattern of the mixture, and, downstream of the hydrodynamic separation device and upstream of the outlet, a diverter for solid material in a form of a perforated barrier located such that the mixture passes to the barrier, with liquid passing generally downwardly through the barrier towards the outlet and solid material being retained on the barrier and being washed by the liquid towards a solids collection region, characterised in that the separator further comprises, located in the outlet, an automatic mechanism responsive to a level of liquid in said mechanism for alternately preventing and allowing a flow of liquid through the outlet, such that, when liquid flow is prevented through the outlet, the flow of the liquid backs up from the outlet and liquid flows back up through the barrier, until it reaches a level at which the mechanism operates to allow the flow of liquid through the outlet.

2. A hydrodynamic separator as claimed in claim 1, wherein said automatic mechanism further includes a generally horizontal conduit containing a flap, pivotably mounted to side walls of the outlet about a horizontal axis, the flap having a generally vertical position in which a flow of liquid to the outlet is prevented, and liquid flows back up through the barrier, so that solid material retained on the barrier is washed by the liquid towards the solids collection region.

3. A hydrodynamic separator as claimed in claim 2, wherein the flap is mounted such that, in steady state, it operates to allow the flow of liquid through the outlet when a liquid level reaches a first level, and operates to prevent the flow of liquid through the outlet when the liquid level reaches a second level, lower than the first level.

4. A hydrodynamic separator as claimed in claim 1 further comprising:
a circular housing having a tangential inlet for the liquid-solid mixture;
wherein the perforated barrier is an inclined annular perforated barrier located such that the mixture passes to the barrier, with liquid passing generally downwardly through the barrier towards the outlet and solid material being retained on the barrier and being washed by the liquid towards said solids collection region; and
wherein said automatic mechanism is such that, when liquid flow is prevented through the outlet, the flow of the liquid backs up from the outlet and liquid flows back up through the barrier to further wash solid material off the barrier to the solids collection region, until the liquid reaches a level at which the mechanism operates to allow the flow of liquid through the outlet.

5. A hydrodynamic separator for a liquid-solid mixture as claimed in claim 1,
wherein the perforated barrier is an inclined perforated barrier;
further including said solids collection region located below said barrier; and
wherein the outlet includes a generally horizontal passageway located to receive liquid which has passed through the barrier, the passageway containing the automatic mechanism and having a passage therethrough to allow liquid to flow from the diverter through the outlet, said automatic mechanism being responsive to a level of liquid therein, such that, when said liquid level exceeds a predetermined level it prevents a flow of liquid through the outlet, and, when said liquid level is below said predetermined level it allows the flow of liquid through the outlet, such that, when liquid flow through the outlet is prevented, liquid fills said passageway between the diverter and said automatic mechanism and flows back up through the barrier, so that solid material retained on the barrier is washed by the liquid towards said solids collection region.

6. A separator for a liquid-solid mixture, the separator comprising:
an inlet;
an outlet;
a diverter for solid material in a form of a perforated barrier, located upstream of the outlet such that, in use, solid material is retained on the barrier and liquid flows through the barrier; and,
located between the diverter and the outlet, such that liquid having flowed through the barrier passes thereto, an automatic mechanism for alternately preventing and allowing a flow of liquid therethrough to the outlet such that, when liquid flow to the outlet is prevented, liquid flows back up through the barrier, so that solid material retained on the barrier is washed by the liquid towards a solids collection region, wherein the mechanism comprises a siphon, having a siphon inlet and a siphon outlet, and defining a crest therebetween, and having an air inlet pipe having a first end and a second end, the first end being connected to the crest, and the second end being located on an inlet side of the siphon above the siphon inlet in an open-topped box having walls with tops, the tops of the walls being at a higher level than the second end of the pipe.

7. A separator for a liquid-solid mixture as claimed in claim 6, further comprising a circular housing having a tangential inlet for the liquid solid mixture;
wherein the perforated barrier is an inclined annular perforated barrier located such that the mixture passes to the barrier, with liquid passing generally downwardly through the barrier towards the outlet and solid material being retained on the barrier and being washed by the liquid towards a solids collection region; and
wherein said automatic mechanism is such that, when liquid flow is prevented to the outlet, the flow of the liquid backs up and liquid flows back up through the barrier to further wash solid material off the barrier to the solids collection region, until the liquid reaches a level at which the mechanism operates to allow the flow of liquid to the outlet.

8. A separator for a solid-liquid mixture as claimed in claim 6, wherein said siphon outlet is at a lower level than said siphon inlet; and
wherein the open-topped box is connected such that the box is in fluid communication with the siphon only through the air inlet pipe.

9. A separator for a liquid-solid mixture as claimed in claim 6, wherein the perforated barrier is an inclined perforated barrier;

further including a solids collection region is located below said barrier; and further including a generally horizontal passageway located to receive liquid which has passed through the barrier, and connected such that fluid flows towards the outlet, the passageway containing the automatic mechanism located between the diverter and the outlet, and having a passage therethrough to allow liquid to flow from the diverter to the outlet, said automatic mechanism being responsive to a level of liquid therein, such that, when said liquid level is below said predetermined level it allows the flow of liquid to the outlet, such that, when liquid flow to the outlet is prevented, liquid fills said passageway between the diverter and said automatic mechanism and flows back up through the barrier, so that solid material retained on the barrier is washed by the liquid towards said solids collection region.

* * * * *